United States Patent
Lee et al.

(10) Patent No.: US 8,055,823 B2
(45) Date of Patent: Nov. 8, 2011

(54) BUS DATA TRANSMISSION APPARATUS, METHOD FOR TRANSMITTING BUS DATA AND BUS DATA COMMUNICATION APPARATUS

(75) Inventors: Jae Sung Lee, Seoul (KR); Seong Woon Kim, Gyeryong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 295 days.

(21) Appl. No.: 12/541,846

(22) Filed: Aug. 14, 2009

(65) Prior Publication Data

US 2010/0161861 A1 Jun. 24, 2010

(30) Foreign Application Priority Data

Dec. 22, 2008 (KR) ........................ 10-2008-0131305

(51) Int. Cl.
*G06F 13/38* (2006.01)
(52) U.S. Cl. .............................. 710/68; 710/62; 709/247
(58) Field of Classification Search .......................... None
See application file for complete search history.

(56) References Cited

U.S. PATENT DOCUMENTS

| | | | |
|---|---|---|---|
| 5,608,396 A * | 3/1997 | Cheng et al. | 341/50 |
| 2001/0038642 A1* | 11/2001 | Alvarez et al. | 370/477 |
| 2003/0212696 A1* | 11/2003 | Davis et al. | 707/101 |
| 2005/0013492 A1* | 1/2005 | Hattori | 382/232 |
| 2007/0244889 A1* | 10/2007 | Fujiyoshi | 707/6 |

FOREIGN PATENT DOCUMENTS

| | | |
|---|---|---|
| JP | 08-030542 A | 2/1996 |
| JP | 2008-193263 A | 8/2008 |

OTHER PUBLICATIONS

Rolf Hakenes et al., "A Segmented Gray Code for Low-Power Mircocontroller Address buses", EUROMICRO Conference, 1998, Germany.
Luca Benini et al., "Address Bus Encoding Techniques for System-Level Power Optimization", Design, Automation and Test in Europe, 1998.
Mircea R. Stan et al., "Bus-Invert Coding for Low Power I/O", IEEE Transactions on Very Large Scale Integration (VLSI) System, vol. 3, No. 1, Mar. 1995.
Youngsoo Shin et al., "Partial Bus-Invert Coding for Power Optimization of System Level Bus", International Symposium on Low Power Electronics and Design, 1998.

\* cited by examiner

*Primary Examiner* — Henry Tsai
*Assistant Examiner* — Michael Sun

(57) ABSTRACT

Provided are a method and an apparatus for compression transmission of bus data including a plurality of bytes including upper bits and lower bits. The apparatus includes a comparator and an aligner. The comparator compares upper bits of a previous byte with upper bits of a current byte among the plurality of bytes. If the upper bits of the previous byte are identical to the upper bits of the current byte, the aligner compresses the bus data in a combination of a full-byte and a half-byte, by allowing the previous byte to be constituted with the full-byte having bits corresponding to the number of bits of the previous byte and allowing the current byte to be constituted with the half-byte excluding the upper bits of the current byte. Then, the aligner arrays the compressed bus data in a preset bus bandwidth to transmit to a slave device.

20 Claims, 4 Drawing Sheets

BUS DATA TRANSMISSION APPARATUS, METHOD FOR TRANSMITTING BUS DATA AND BUS DATA COMMUNICATION APPARATUS

CROSS-REFERENCE TO RELATED APPLICATIONS

This application claims priority under 35 U.S.C. §119 to Korean Patent Application No. 10-2008-0131305, filed on Dec. 22, 2008, in the Korean Intellectual Property Office, the disclosure of which is incorporated herein by reference in its entirety.

TECHNICAL FIELD

The present disclosure relates to a data transmission method and an apparatus thereof, and in particular, to a bus data compression method and an apparatus capable of achieving improvement of bus performance according to data compression and reducing bus power consumption by reducing a toggling frequency of each signal value of a data bus.

BACKGROUND

Bus communication protocols generally divide bus signals into three groups—address bus signals, control bus signals, and data bus signals.

FIG. 1 a diagram illustrating an exemplary configuration and an exemplary data transmission process of related-art bus signals that are classified into the three groups.

Referring to FIG. 1, when transmitting data, an address signal ADDR representing a destination of data, and a control signal CTRL are transmitted in the first bus cycle. The data signal DAT is transmitted from a next bus cycle.

According to circumstance, there is a bus communication protocol that divides the first bus cycle into two different cycles—an address cycle and a control cycle.

According to another communication protocol, an address signal and a data signal may share one physical bus when the number of signal lines is limited. In this case, one physical bus serves as an address bus in an address cycle, and serves as a data bus in a data transmission cycle.

Thus, in order to transmit information such as an address signal, a control signal, and a data signal, related-art bus communication protocols transmit a data signal in a simple and standardized bus cycle order. However, these related-art bus communication protocols are inefficient because all overlapping data are transmitted in a data transmission process even when adjacent data overlap each other. For example, when a large amount of multimedia data are continuously transmitted, adjacent data carrying partially overlapping contents are frequently transmitted. In this case, the adjacent data having partially overlapping contents are inevitably transmitted as is. This may result in not only a waste of bus bandwidth, but also an increase of bus power consumption.

When various related-art data compression algorithms (for example, entropy coding, variable length coding, code-book coding, arithmetic coding, and the like) are used, wasted bus bandwidth and bus electric power according to the overlapping data transmission are reduced.

However, in order to implement the above data compression algorithms, look-up tables, large-sized buffers, and algorithm processing logics are required. This may lead to costly hardware design and transmission delay due to complex algorithm operation. Moreover, it is inappropriate in terms of cost to apply expensive hardware to a simple bus system to implement the data compression algorithms.

Studies on the bus encoding schemes (for example, differential coding, gray coding, bus invert coding and the like) have been carried out to reduce bus power consumption. The bus encoding schemes encode data values in every bus cycle to reduce the toggling frequency of a signal.

However, because the above encoding schemes are focused only on reducing power consumption, the bus bandwidth is still wasted due to transmission of overlapping data. Also, designs for separate hardware such as additional control signal lines, look-up tables for coding, and temporary buffers inevitably accompany the bus encoding schemes as well as related-art data compression algorithms. Consequently, these bus encoding schemes are not cost-effective.

Accordingly, a method of achieving bus data compression transmission at a minimum cost is required.

SUMMARY

In one general aspect, an apparatus for compression transmission of bus data that includes a plurality of bytes having upper bits and lower bits, the apparatus includes: a comparator comparing upper bits of a previous byte with upper bits of a current byte among the plurality of bytes; and an aligner compressing the bus data in a combination of a full-byte and a half-byte by allowing the previous byte to be constituted with the full-byte having bits corresponding to the number of bits of the previous byte and allowing the current byte to be constituted with the half-byte excluding the upper bits of the current byte if the upper bits of the previous byte are identical to the upper bits of the current byte, and arraying the compressed bus data in a preset bus bandwidth to transmit to a slave device.

The aligner may transmit a pattern indicator about a pattern of the compressed bus data to the receiving end.

The aligner may create the pattern indicator using the number and the array locations of the half-bytes excluding the upper bits.

In a current cycle, the aligner may transmit the compressed bus data includes: at least one full-byte; at least one half-byte excluding the upper bits; and upper bits of a full-byte assigned over a previous cycle and the current cycle.

In a current cycle, the aligner may transmit the compressed bus data including: at least one full-byte; at least one half-byte excluding the upper bits; and lower bits of a full-byte assigned over the current cycle and a later cycle.

The aligner creates may transmit the compressed bus data including: at least one full-byte; and at least two half-bytes.

In a current cycle, the aligner may transmit the compressed bus data including: at least two half-bytes; upper bits of a full-byte assigned over a previous cycle and the current cycle; and lower bits of another full-byte assigned over the current cycle and a later cycle.

In a current cycle, the aligner may transmit the compressed bus data including: at least three half-bytes; upper bits of a full-byte assigned over a previous cycle and the current cycle, or lower bits of another full-byte assigned over the current cycle and a later cycle.

The aligner may transmit the compressed bus data including at least four half-bytes.

If the upper bits of the previous byte is different from the upper bits of the current byte, an aligner may array the bus data in the present bus bandwidth to transmit, by allowing the previous byte to be constituted with the full-byte having bits corresponding to the number of bits of the previous byte and allowing the current byte to be constituted with another full-byte having bits corresponding to the number of bits of the current.

The preset bus bandwidth may be one of a 16-bit bus bandwidth and a 32-bit bus bandwidth.

In another general aspect, a data communication apparatus includes: a transmitter receiving bus data including a plurality of bytes, if a previous byte of the plurality of bytes is identical to upper bits of a current byte, compressing the bus data in a combination of a full-byte and a half-byte by allowing the previous byte to be constituted with the full-byte and allowing the current byte to be constituted with the half-byte excluding the upper bits, and arraying the compress bus data in a preset bus bandwidth to transmit; a data bus delivering the compressed bus data by a preset bus bandwidth unit; a control bus delivering a pattern signal including information on a transmission pattern of the compressed bus data; and a receiver receiving the compressed bus data and the pattern signal through the data bus and the control bus, respectively, and restoring the excluded upper bits using the received pattern signal.

The transmitter may further transmit a control bus signal including at least one of traffic type, burst type, data size, and cash control through the control bus.

The transmitter may transmit the pattern signal to the receiver after the control bus signal is transmitted.

The transmitter may create the pattern signal using the number and the array locations of the half-bytes excluding the upper bits.

The transmitter may include a comparator comparing upper bits of a previous byte with upper bits of a current byte among the plurality of bytes; an aligner compressing the bus data in a combination of a full-byte and a half-byte by allowing the previous byte to be constituted with the full-byte having bits corresponding to the number of bits of the previous byte and allowing the current byte to be constituted with the half-byte excluding the upper bits of the current byte if the upper bits of the previous byte are identical to the upper bits of the current byte, and arraying the compressed bus data in a preset bus bandwidth to transmit to a slave device.

The bus bandwidth may be a 16-bit bus bandwidth and the aligner may transmit the compressed bus data including one to four half-bytes in the 16-bit bus bandwidth.

The bus bandwidth may be a 32-bit bus bandwidth and the aligner may transmit the compressed bus data including one to eight half-bytes in the 32-bit bus bandwidth.

If the preset bus bandwidth is 16-bit bus bandwidth, the number of lines of the control bus may be three, and if the preset bus bandwidth is 32-bit bus bandwidth, the number of lines of the control bus may be six.

In another general aspect, a data transmission method includes: receiving bus data including a plurality of bytes to compare upper bits of a previous byte with upper bits of a current byte among the plurality of bytes; allowing the previous byte to be constituted with the full-byte and allowing the current byte to be constituted with the half-byte excluding the upper bits of the current byte if the upper bits of the previous byte are identical to the upper bits of the current byte; combining the full-byte and the half-byte to compress the bus data; and arraying the compressed bus data in a preset bus bandwidth to transmit.

Other features and aspects will be apparent from the following detailed description, the drawings, and the claims.

DETAILED DESCRIPTION OF EMBODIMENTS

Figure 1:
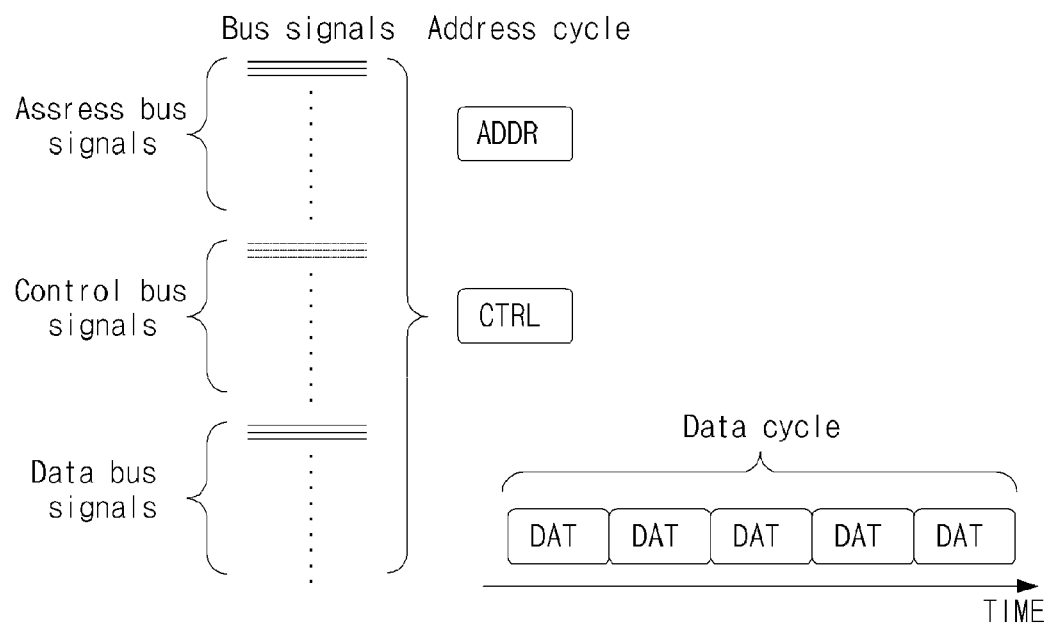
FIG. 1 is a diagram illustrating an exemplary configuration and an exemplary data transmission process of related-art bus signals that are classified into the three groups.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

A method for bus data compression according to an embodiment will be described with reference to FIG. 2.

Figure 2:
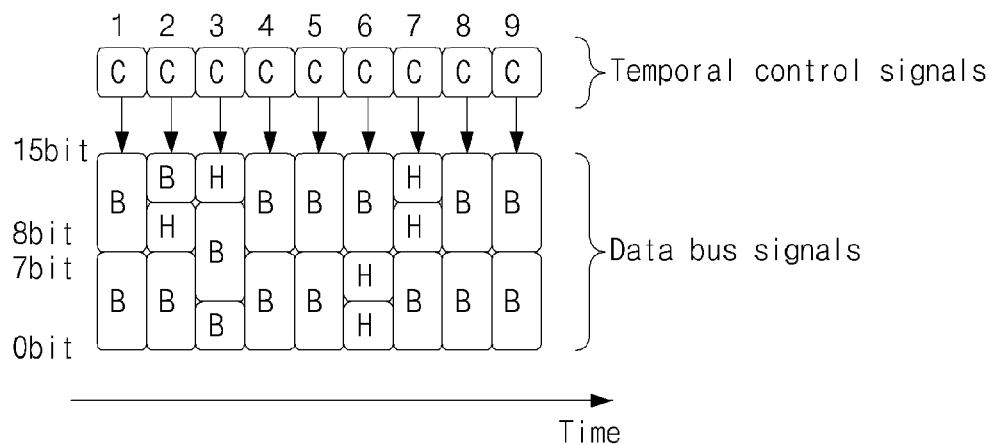
FIG. 2 is a diagram illustrating an exemplary bus data compression transmission according to an embodiment.

FIG. 2 is a diagram illustrating an exemplary transmission of the compressed bus data according to an embodiment. Here, 'B' described in FIG. 2 represents a full-byte, 1 byte (8 bits) data. 'H' represents a half-byte (4 bits), which lacks upper 4 bits. Nine bus cycles C1 to C9 are described in FIG. 2. 2-byte bus data is transmitted into a slave device in a cycle.

Generally, image data are transmitted by 1-byte unit. Adjacent (continuous in terms of time) image data mostly have upper 4 bits. Accordingly, the data array pattern of each image data is described in two forms of 'B' and 'H' in this embodiment.

Meantime, alphabet capital letter 'C' described in FIG. 2 represents a control bus signal. The control bus data lines transmitting control bus data does not operate at a section where the data bus signal is transmitted in a lump. That is, upon transmission of the data bus signal, the control bus signal lines go into a dormant state. An operation of informing the slave device of a compression pattern of data in each data bus cycle is performed while the control bus data lines are maintained in the dormant state in this embodiment.

The control bus signals in related-art bus communication protocols deliver various information such as traffic type, burst type & size, cash control to the slave device. These control bus signals are necessary only during initial transmission cycle, while the control bus signals are unnecessary during actual data transmission. Accordingly, related-art bus communication schemes waste many signal lines. In consideration of this point, signal lines of dormant state are reused in this embodiment, and the reused signal lines serve to inform a slave device of a pattern of the transmitted data.

It is assumed that bus data transmission is performed according to a byte order of a little-endian scheme in this embodiment. However, the bus data transmission may be performed according to a byte order of a big-endian scheme. In this case, each pattern at a slave device is turned reversed.

Hereinafter, a compression method of the bus data according to an embodiment will be described in detail.

In a first bus cycle 1, two full-byte data are transmitted. In a second busy cycle 2, the first full-byte B is transmitted as it is. In this case, if upper 4 bits of a second full-byte to be secondly transmitted is identical to upper 4 bits of the first full-byte B in the second bus cycle, a half-byte is transmitted with the upper 4 bits of the second full-byte removed.

Next, one full-byte B is transmitted over the second bust cycle 2 and a third bus cycle 3. One full-byte is identical to upper 4 bits in the third bus cycle 3, so that omitted half-byte H is transmitted.

When data is compressed to be transmitted, a slave device is informed of a compressed data array pattern through a related-art control bus signal C. In this case, control bus signal lines serve to inform about a data transmission pattern. Hereinafter, the control bus signal that informs about the compressed data array pattern is referred to as a pattern indicator (PI).

Hereinafter, compression methods of bus data for data bus bandwidth (8, 16, and 32 bits) according to embodiments will be described in detail with reference to FIGS. 3 through 5.

Figure 3:
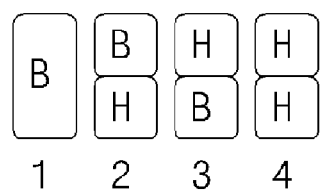
FIG. 3 is a diagram illustrating a data transmission pattern in an 8-bit bus bandwidth according to an embodiment.

FIG. 3 is a diagram illustrating a data transmission pattern in an 8-bit bus bandwidth according to an embodiment.

Referring to FIG. 3, a data transmission pattern may include four patterns in an 8-bit bus bandwidth (i.e., 1-byte channel).

More specifically, a leftmost first pattern 1 in FIG. 3 includes a first full-byte B1 1-byte without any omission. A second pattern 2 includes a first half-byte H and lower 4 bits of a second full-byte B. A third pattern 3 includes upper 4 bits of the second full-byte B and a second half-byte. A fourth pattern 4 includes a third half-byte and a fourth half-byte.

Thus, in a system having 8-bit bus bandwidth that can be expressed as four types of the data transmission patterns, the number of signal lines transmitting a PI signal is two ($\log_2 4$).

Figure 4:
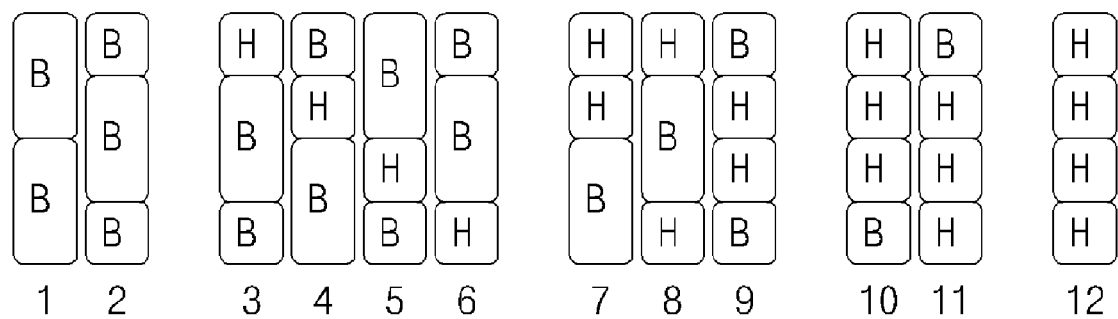
FIG. 4 is a diagram illustrating a data transmission pattern in a 16-bit bus bandwidth according to an embodiment.

FIG. 4 is a diagram illustrating a data transmission pattern in a 16-bit bus bandwidth according to an embodiment.

Referring to FIG. 4, a data transmission pattern in 16-bit bus bandwidth may be divided into five types according to the number of half-byte H and an array location in the 16-bit bus bandwidth.

More specifically, if the number of the half-byte H is 0, as described in FIG. 4, there are two types of patterns 1 and 2. If the number of the half-byte H is 1, there are four types of patterns 3, 4, 5 and 6. If the number of the half-byte H is 2, there are three types of patterns 7, 8 and 9. If the number of the half-byte H is 3, there are two types of patterns 10 and 11. If the number of the half-byte H is 4, there is one type of pattern 12. Accordingly, there are twelve types of patterns 1 through 12 in the 16-bit bus bandwidth. The number of signal lines transmitting a PI signal is 4, a value obtained by applying the ceiling function to $\log_2 12$. Accordingly, a PI signal of total 4 bits is required.

However, when lower 4 bits and upper 4 bits are transmitted over two bus cycles that are consecutive (the lower 4 bits are firstly transmitted in the antecedent bus cycle among the two bus cycles, and then the upper 4 bits are transmitted in the subsequent bus cycle), the pattern type of the subsequent bus cycle is limited by that of the antecedent bus cycle. Accordingly, the number of signal lines of the PI signal can be reduced.

For example, patterns that may follow the pattern 2 are limited to the patterns 2, 3, 5, 9 and 10. Although, on the contrary, the upper 4 bits and the lower 4 bits are not transmitted over two bus cycles, types of subsequent patterns are limited. For example, patterns that can succeed the pattern 1 are limited to seven patterns 1, 4, 6, 7, 8, 11 and 12.

Patterns that can succeed the patterns 1, 3, 5, 7, 8, 10 and 12 are limited to the seven patterns 1, 4, 6, 7, 8, 11 and 12, and patterns that can succeed the patterns 2, 4, 6, 9 and 11 are limited to the five patterns 2, 3, 5, 9 and 10. Accordingly, three PI signals are enough (the ceiling function of $\log_2 7$ is 3).

Figure 5:
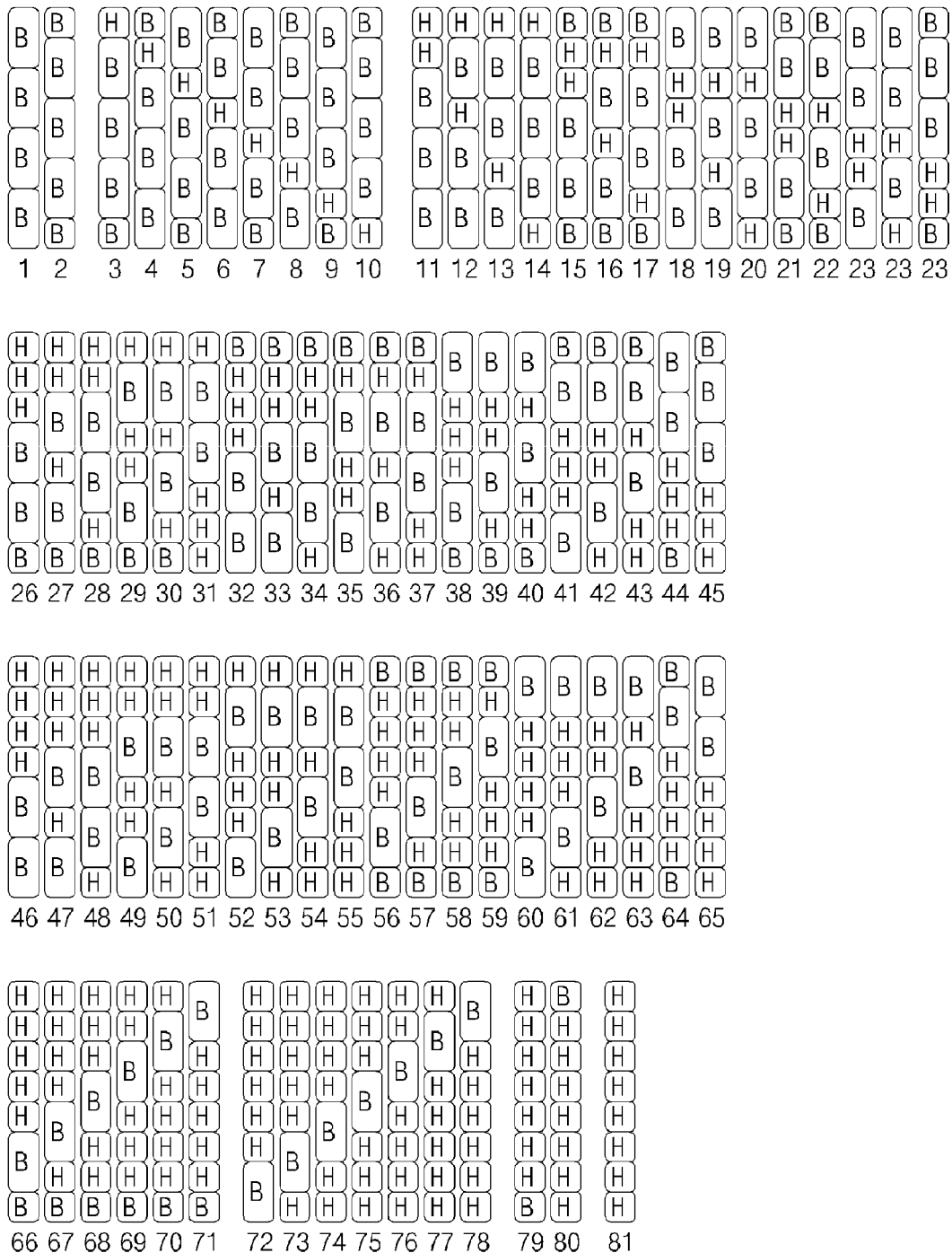
FIG. 5 is a diagram illustrating a data transmission pattern in a 32-bit bus bandwidth according to an embodiment.

FIG. 5 is a diagram illustrating a data transmission pattern in a 32-bit bus bandwidth according to an embodiment.

Referring to FIG. 5, a data transmission pattern in 32-bit bus bandwidth may be divided into eight types according to the number of half-byte H and an array location in the 16-bit bus bandwidth.

In the case of 32-bit bus bandwidth, the number of necessary signal lines of a PI signal is 7, a value obtained by applying the ceiling function to $\log_2 81$. Accordingly, a PI signal of total 7 bits is required However, like 16-bit bus bandwidth, the number of patterns in a subsequent bus cycle is limited according to whether lower 4 bits and upper 4 bits of a full-byte are transmitted over two bus cycles in the 32-bit bus bandwidth.

More specifically, patterns that can succeed patterns 1, 3, 5, 7, 9, 11, 12, 13, 14, 18, 19, 20, 23, 24, 26, 27, 28, 29, 30, 31, 38, 39, 40, 44, 46, 47, 48, 49, 50, 51, 52, 53, 54, 55, 60, 61, 62, 63, 65, 66, 67, 68, 69, 70, 71, 72, 73, 74, 75, 76, 77, 78, 79 and 81 are limited to 48, patterns 1, 4, 6, 8, 10, 11, 12, 13, 14, 18, 19, 20, 23, 24, 32, 33, 34, 35, 36, 37, 41, 42, 43, 45, 46, 47, 48, 49, 50, 51, 52, 53, 54, 55, 60, 61, 62, 63, 65, 72, 73, 74, 75, 76, 77, 78, 80 and 81.

Patterns that can succeed patterns 2, 4, 6, 8, 10, 15, 16, 17, 21, 22, 25, 32, 33, 34, 35, 36, 37, 41, 42, 43, 45, 56, 57, 58, 59, 64 and 80 are limited to 33, patterns 2, 3, 5, 7, 9, 15, 16, 17, 21, 22, 25, 26, 27, 28, 29, 30, 31, 38, 39, 40, 44, 56, 57, 58, 59, 64, 66, 67 and 68. Accordingly, since the ceiling function of $\log_2 48$ is 6, the number of necessary signal lines of a PI signal is reduced from 7 to 6.

If the number of signal line of PI signals is still insufficient, a kind of subset defining only a part of patterns among a set of patterns enumerated above may be used.

Hereinafter, an apparatus implementing the above-described data compression method in hardware according to an embodiment will be described.

Figure 6:
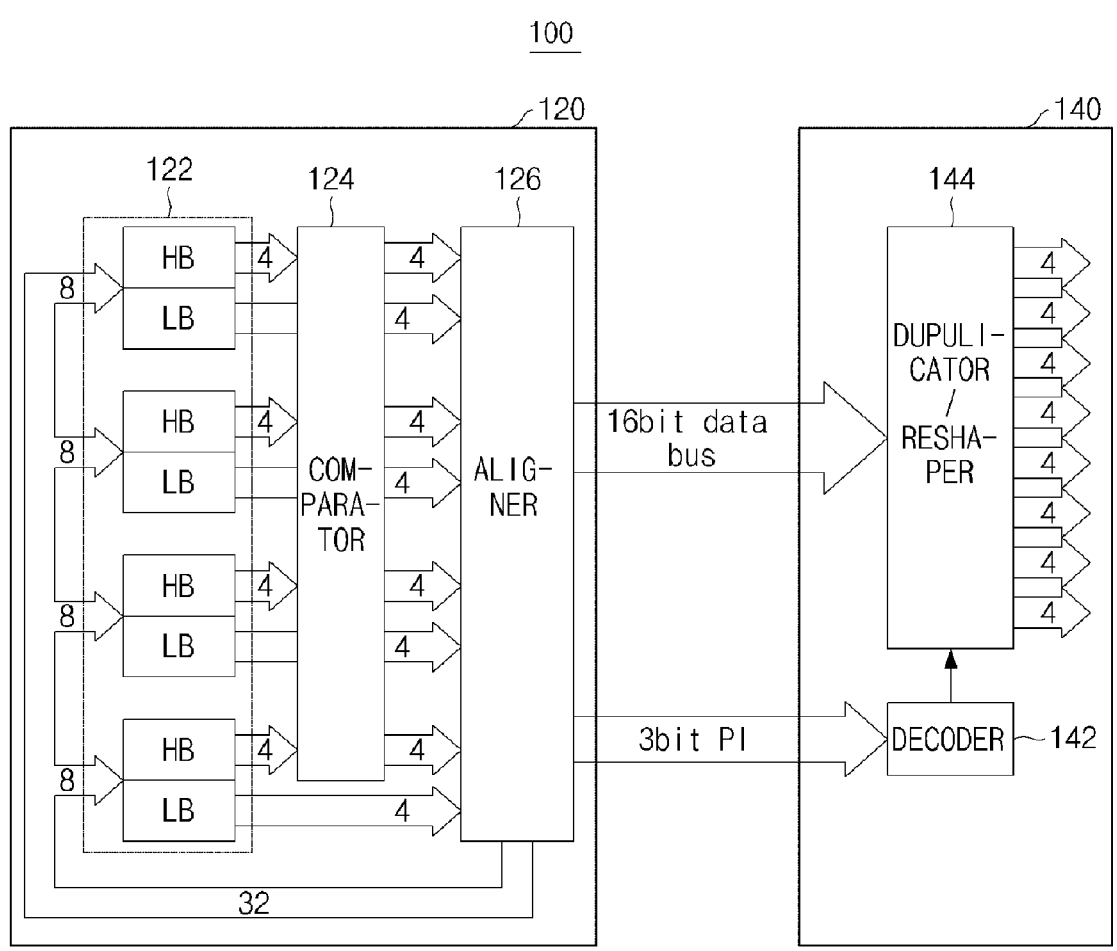
FIG. 6 is a block diagram illustrating a data communication apparatus transmitting/receiving compressed bus data according to an embodiment.

FIG. 6 is a block diagram illustrating a data communication apparatus transmitting/receiving compressed bus data according to an embodiment. An exemplary data communication apparatus transmitting/receiving 16-bit bus data is illustrated in FIG. 6. Each arrow in FIG. 6 indicates a flow of a signal, and a numeral therein indicates a bit width of each signal.

Referring to FIG. 6, a method for making a pattern is similar to those described with reference to FIGS. 2 to 5. A data communication apparatus using the method according to an embodiment may be simply implemented as described in FIG. 6. Here, a bus including a wait signal like an invalid signal (most buses include the wait signal) may be more conveniently and simply implemented in hardware, and be conceptually similar to a structure illustrated in FIG. 6.

A data communication apparatus 100 according to an embodiment includes a transmitter 120 and a receiver 140.

The transmitter 120 and the receiver 140 are connected to each other through a data bus line and a control bus line.

The transmitter 120 includes a register 122, a comparator 124, and an aligner 126. The receiver 140 includes a decoder 142 and a duplicator/reshaper. The transmitter 120 and the receiver 140 are connected to each other through the data bus line and the control bus line. A 16-bit data bus signal is transmitted to the transmitter 120 through the data bus line. A 3-bit PI signal is transmitted to the receiver 140 through the control bus line. Although not shown in FIG. 6, an address bus line may further be included to deliver an address bus signal from the transmitter 120 to the receiver 140.

HB in the register 122 of the transmitter 120 refers to upper 4 bits of 1-byte, LB refers to lower 4 bits. Accordingly, HB and LB means one byte (full-byte). In this embodiment, the data communication apparatus 100 transmits and receives a 16-bit bus data. In this case, the pattern 12 in FIG. 4 may perform the maximum 4-byte data compression transmission. Accordingly, 4-byte (i.e., two times of the bus bandwidth) is always prepared in the register 122.

The comparator 124 compares upper 4 bits of each of the prepared bytes, and sorts a part to be omitted.

Except the part omitted by the comparator 124, remaining data is arrayed on the aligner 126. A slave device is informed of data array patterns of the arrayed data through a 3-bit PI signal. The PI signal is time-multiplexed with the control bus signal on the inside of the aligner 126. The multiplexer is not shown to simplify the drawing.

Remaining data that do not be arrayed in a corresponding bus cycle is fed back to the register 122, and re-arrayed in order.

The decoder 142 provided in the receiver 140 decodes the PI signal delivered through the control bus line, determines a shape of a data array pattern through the decoded PI signal, and delivers a determination result to the duplicator/reshaper 144.

The duplicator/reshaper 144 restores an omitted HB from continuous byte information, based on the determination result by the decoder 142 deliver to a next stage in a total 16-bit array.

The following algorithm is an example of a program code representing a data compression method according to an embodiment. The transmitter 120 in FIG. 6 may further include a recording medium storing the following program code:

```
start:
if (data_left == 0)
    if (Temp_HB! =Input_Data [7: 4])
        {Output_Data [7: 0] = Input_Data [7: 0];
        Temp_HB = Input_Data [7: 4];
        data_left = 0;}
    else
        {Output_Data [7: 4] = Input_Data [3: 0];
        data_left = 1;}
else (data_left == 1)
    if (Temp_HB! =Input_Data [7: 4])
        {Output_Data [3: 0] = Input_Data [7: 4];
        Temp_HB = Input_Data [7: 4];
        data_left = 1;}
    else
        {Output_Data [3: 0] = Input_Data [3: 0];
        data_left = 0;}
check ( );
go to start;
```

The program code is repeatedly executed until a data transmission is completed.

Detailed description of the program code will be described below.

The check function (check ( )) at the end of the program code checks whether data reaches a full-size of a corresponding data bus bandwidth. Whenever the data reaches the full-size of the corresponding data bus bandwidth, data corresponding to one bus cycle is transmitted. The check function may be implemented by hardware such as a simple counter and a comparator.

A parameter (data_left) in the program code is set to 1 if 4-bit data remain in an align processing of the current byte, or if 4-bit data is short. That is, if the parameter is 0, this means that byte data reached an exactly full-size output byte signal (Output_Data[7:0]).

In the above program code, Input_Data[7:0] means byte data subject to current modulation, and Temp_HB means upper 4 bits data of immediately previous processed byte data.

If upper 4 bits data of one byte data subject to current modulation are identical to upper 4 bits data of immediately previous processed byte data, the condition function (if ( )) performs a comparison to omit the overlapping bits.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different scheme and/or replaced or supplemented by other components or their equivalents. Accordingly, other implementations are within the scope of the following claims.

What is claimed is:

1. An apparatus for compression transmission of bus data that comprises a plurality of bytes comprising upper bits and lower bits, the apparatus comprising:
    a comparator comparing upper bits of a previous byte with upper bits of a current byte among the plurality of bytes; and
    an aligner compressing the bus data in a combination of a full-byte and a half-byte by allowing the previous byte to be constituted with the full-byte having bits corresponding to the number of bits of the previous byte and allowing the current byte to be constituted with the half-byte excluding the upper bits of the current byte if the upper bits of the previous byte are identical to the upper bits of the current byte, and arraying the compressed bus data in a preset bus bandwidth to transmit to a slave device.

2. The apparatus of claim 1, wherein the aligner transmits a pattern indicator about a pattern of the compressed bus data to the receiving end.

3. The apparatus of claim 2, wherein the aligner creates the pattern indicator using the number and the array locations of the half-bytes excluding the upper bits.

4. The apparatus of claim 1, wherein, in a current cycle, the aligner transmits the compressed bus data comprising:
    at least one full-byte;
    at least one half-byte excluding the upper bits; and
    upper bits of a full-byte assigned over a previous cycle and the current cycle.

5. The apparatus of claim 1, wherein, in a current cycle, the aligner transmits the compressed bus data comprising:
    at least one full-byte;
    at least one half-byte excluding the upper bits; and
    lower bits of a full-byte assigned over the current cycle and a later cycle.

6. The apparatus of claim 1, wherein the aligner transmits the compressed bus data comprising:
    at least one full-byte; and
    at least two half-bytes.

7. The apparatus of claim 1, wherein, in a current cycle, the aligner transmits the compressed bus data comprising:
    at least two half-bytes;
    upper bits of a full-byte assigned over a previous cycle and the current cycle; and
    lower bits of another full-byte assigned over the current cycle and a later cycle.

8. The apparatus of claim 1, wherein, in a current cycle, the aligner transmits the compressed bus data comprising:
- at least three half-bytes; and
- upper bits of a full-byte assigned over a previous cycle and the current cycle, or lower bits of another full-byte assigned over the current cycle and a later cycle.

9. The apparatus of claim 1, wherein the aligner transmits the compressed bus data comprising at least four half-bytes.

10. The apparatus of claim 1, wherein, if the upper bits of the previous byte is different from the upper bits of the current byte, an aligner arrays the bus data in the present bus bandwidth to transmit, by allowing the previous byte to be constituted with the full-byte having bits corresponding to the number of bits of the previous byte and allowing the current byte to be constituted with another full-byte having bits corresponding to the number of bits of the current.

11. The apparatus of claim 1, wherein the preset bus bandwidth is one of a 16-bit bus bandwidth and a 32-bit bus bandwidth.

12. A data communication apparatus comprising:
- a transmitter receiving bus data comprising a plurality of bytes, if a previous byte of the plurality of bytes is identical to upper bits of a current byte, compressing the bus data in a combination of a full-byte and a half-byte by allowing the previous byte to be constituted with the full-byte and allowing the current byte to be constituted with the half-byte excluding the upper bits, and arraying the compress bus data in a preset bus bandwidth to transmit;
- a data bus delivering the compressed bus data by a preset bus bandwidth unit;
- a control bus delivering a pattern signal comprising information on a transmission pattern of the compressed bus data; and
- a receiver receiving the compressed bus data and the pattern signal through the data bus and the control bus, respectively, and restoring the excluded upper bits using the received pattern signal.

13. The data communication apparatus of claim 12, wherein the transmitter further transmits a control bus signal comprising at least one of traffic type, burst type, data size, and cache control through the control bus.

14. The data communication apparatus of claim 13, wherein the transmitter transmits the pattern signal to the receiver after the control bus signal is transmitted.

15. The data communication apparatus of claim 14, wherein the transmitter creates the pattern signal using the number and the array locations of the half-bytes excluding the upper bits.

16. The data communication apparatus of claim 12, wherein the transmitter comprises:
- a comparator comparing upper bits of a previous byte with upper bits of a current byte among the plurality of bytes;
- an aligner compressing the bus data in a combination of a full-byte and a half-byte by allowing the previous byte to be constituted with the full-byte having bits corresponding to the number of bits of the previous byte and allowing the current byte to be constituted with the half-byte excluding the upper bits of the current byte if the upper bits of the previous byte are identical to the upper bits of the current byte, and arraying the compressed bus data in a preset bus bandwidth to transmit to a slave device.

17. The data communication apparatus of claim 16, wherein the bus bandwidth is a 16-bit bus bandwidth and the aligner transmits the compressed bus data comprising one to four half-bytes in the 16-bit bus bandwidth.

18. The data communication apparatus of claim 16, wherein the bus bandwidth is a 32-bit bus bandwidth and the aligner transmits the compressed bus data comprising one to eight half-bytes in the 32-bit bus bandwidth.

19. The data communication apparatus of claim 16, wherein, if the preset bus bandwidth is 16-bit bus bandwidth, the number of lines of the control bus is three, and
- if the preset bus bandwidth is 32-bit bus bandwidth, the number of lines of the control bus is six.

20. A data transmission method comprising:
- receiving bus data comprising a plurality of bytes to compare upper bits of a previous byte with upper bits of a current byte among the plurality of bytes;
- allowing the previous byte to be constituted with the full-byte and allowing the current byte to be constituted with the half-byte excluding the upper bits of the current byte if the upper bits of the previous byte are identical to the upper bits of the current byte;
- combining the full-byte and the half-byte to compress the bus data; and
- arraying the compressed bus data in a preset bus bandwidth to transmit.

* * * * *